United States Patent [19]
Germond et al.

[11] 4,000,819
[45] Jan. 4, 1977

[54] CONTROL ARM FOR A POWER MANIPULATOR

[75] Inventors: Jean-Claude Germond, Paris; Théodore Le Mouee, Nantes; Paul Marchal, Gif-sur-Yvette; Michel Petit, La Celle St-Cloud; Jean Vertut, Issy-les-Moulineaux, all of France

[73] Assignee: Commissariat a l'Energie Atomique, Paris, France

[22] Filed: Jan. 20, 1976

[21] Appl. No.: 650,657

[30] Foreign Application Priority Data

Jan. 20, 1975 France ............................ 75.01692

[52] U.S. Cl. ............................................. 214/1 CM
[51] Int. Cl.² ............................................ B25J 3/04
[58] Field of Search ................................ 214/1 CM

[56] References Cited
UNITED STATES PATENTS 3,661,276  5/1972  Wiesener ................. 214/1 CM
3,904,042  9/1975  Colston ................... 214/1 CM Primary Examiner—Robert J. Spar
Assistant Examiner—George F. Abraham
Attorney, Agent, or Firm—Sughrue, Rothwell, Mion, Zinn & Macpeak

[57] ABSTRACT

The control arm for a remotely operated power manipulator comprises a system for carrying out a number of movements and position detectors for each movement. The number of possible movements of the arm is equal to the number of possible movements of the manipulator and motion-control operations can be interrupted at will. Means are provided on at least one portion of the control arm for interlockiing it with respect to another portion of the arm independently of the other movements as long as the position of the manipulator and of the arm have not been brought into complete concordance and for releasing the interlock when complete concordance is achieved.

9 Claims, 5 Drawing Figures

CONTROL ARM FOR A POWER MANIPULATOR

This invention relates to a control arm for a remotely operated power manipulator.

The invention provides a solution to the problem of remote control in which a manipulator is directed at a distance under the visual control of an operator and receives power from a source other than the force applied by the operator but is nevertheless displaced with a degree of precision and at velocities such that the loss of manual dexterity of the operator is negligible. This holds true even when the manipulator is displaced across a space which is encumbered with materials and equipment and which may also be of large size, with the result that the manipulator cannot be controlled visually in a satisfactory manner unless the operator changes his position.

There are known types of direct mechanical-control manipulators in which the movements imparted by an operator to a master assembly are reproduced directly by a slave assembly without any supply of energy. The possibilities of these appliances are clearly limited both by considerations of weight of the slave elements and by considerations of volume which can be swept by said elements; their use has therefore been developed only for laboratory research work or the like.

In one type of power manipulator which is also known, the manipulator element proper is actuated by a control system comprising levers or push-buttons which have the effect of giving orders of torque or velocity to each of the motors or movements of the manipulator. Manipulators of the type just mentioned are much slower to control than the type first mentioned. As can readily be understood, the reason for this is that it proves much more difficult to combine the different movements required while dispensing with spontaneous manual actions which, in the first case, result in the reproduction of any one manual action by breaking down and then recombining the desired motion in the form of elementary movements of the manipulator.

This difficulty has been overcome by using two levers which serve to carry out manipulator control by sharing the main movements. Thus one lever combines the movements of displacement and the other level combines the movements of orientation of the manipulator. It will be noted that manipulators of this type are caused to move within a large volume whereas the operator himself remains limited in the manual actions which are intended to perform manipulator control. For this reason, these systems produce all-or-none or progressive control of the speed of each movement without performing position control at any moment. There has also been carried out an approximate speed control which, by being applied from a master arm having a configuration which is similar to that of the slave arm, has the effect of reconstituting on said slave arm displacements which are approximately equal or proportional to those of the master arm. By virtue of its geometry, said master arm ensures the break-down and recombination of the desired motion in the form of degrees of freedom of the manipulator. A system of this type governs only the movements of the manipulator arm whilst the movements of the bridge or cross-beam which carries said arm constitute changes of origin, with the result that this offers only a partial solution to the problem stated earlier.

The same control problem is met with in the programming stage of programmable manipulators which is carried out point by point in the majority of cases by means of a push-button control system which is more or less close to the configuration of the arm but is still attended by the disadvantages mentioned above.

The aim of the invention is therefore to provide a control arm which alone makes it possible to control a complete manipulator and in addition:
 enables the operator to produce action in exactly the same manner as if he were himself holding the tool in his hand,
 allows the possibility of changing the correlation between the movements of the arm and the movements of the tool or of shifting coordinates or scales while subsequently making it possible in all positions to restore the correspondence between the position of the arm and that of the tool.

The human hand is capable of performing a very large number of different movements; in point of fact, the position of an object in space can be defined by only six parameters which can be made to correspond to three movements of translation and three movements of rotation. In order to restitute the manual dexterity of the operator, it is intended in accordance with the invention to ensure that the possible movements of the arm equal in number to the possible movements of the manipulator, irrespective of the additional displacements which can correspond to parameters such as the rate of flow of fluid in the case of a spray gun or the opening of jaws in the case of a tong unit, and that each movement of the arm is associated with one movement of the manipulator.

The term "movement" is understood to mean a movement of rotation about a stationary shaft or a shaft which is rigidly fixed to a movable member, or a movement of translation along rails or within guides which are either stationary or rigidly fixed to a movable member. However, a movement of rotation or a movement of translation of the arm need not necessarily be associated respectively with a movement of rotation or a movement of translation of the manipulator as will become apparent hereinafter. For the sake of simplicity, the term movement will be understood in this case to include variations in parameters such as the rate of flow of fluid or the opening of jaws of a tong unit as well as the displacement of the corresponding controls on the control arm.

In order to facilitate the operator's task, the various movements of the arm should preferably be braked so that the operator may consequently be given impressions which are similar to those produced by the mass of the tool and of the parts employed.

As stated earlier, one movement of the manipulator is associated with each movement of the arm. The arrangement which initially comes to mind for achieving this association is that of a continuous and reciprocal control so that each displacement of one of the elements accordingly corresponds to a similar displacement of the other. This solution is very similar to that of the direct mechanical-control manipulator mentioned earlier but differs therefrom in that the amplification and reduction ratios can be varied much more easily in the case of each movement. It is thus possible to work within large spaces by operating with low amplification in one zone, then by passing into the adjacent zone by means of a rapid displacement carried out with high amplification and subsequently returning to low amplification in order to operate in the new zone.

The disadvantage of this design solution, however, lies in the fact that the arm must also be power-driven in order to ensure that any movement and even a non-controlled movement of the manipulator is transferred to the arm, thus introducing a complication and increasing the cost price.

The device in accordance with the invention is of a different type: the motion-control operations can be interrupted at will and the arm is in this case not necessarily power-driven. The following problem accordingly arises: when the motion-control operations are interrupted, the arm and the manipulator move independently and when the control operations are restored, the position of the manipulator can be different from that which corresponds to the position of the arm at the same moment. In consequence, the control mechanisms will record a difference and cause a displacement of the manipulator and return this latter to the position corresponding to that of the arm.

The displacement mentioned above is liable to be abrupt if braking systems are not provided and is in any case attended by a major disadvantage in that the operator cannot possibly exercise any control over said displacement since it is carried out solely under the action of the motion-control mechanisms. In order to overcome this drawback, it is ensured in accordance with the invention that each movement of the arm for which it is considered necessary is provided with an interlock system which maintains the arm in a stationary position in respect of said movement and prevents the operation of the motion-control systems as long as the positions of the manipulator and of the arm have not been brought into complete concordance for all the movements. As can readily be understood, said concordance will usually be obtained by manual displacement of the arm, movement after movement.

When complete concordance has been achieved, all the interlocks are released and the motion-control systems are then permitted to come into operation.

Complete concordance is understood to mean that, in the case of each movement, the difference between the real position of an element and that which corresponds to the position of the other element is smaller than a predetermined limiting value in order to prevent any damage when the motion-control systems are put into operation. However, said limiting value is of a fairly high order in order to be compatible with motion-control tolerances and to forestall any potential danger of untimely interlocking actions.

In a preferred embodiment, the movements of the arms are essentially movements of rotation, each portion of the arm being pivotally mounted on the preceding portion and the first portion being pivotally mounted on a frame. A pivotal movement can be more readily performed and detected than a sliding movement in respect of an equal degree of accuracy.

It will be noted that, if a manipulator is designed in accordance with a cartesian and telescopic system, the spatial reproduction resulting from this system will be deformed since the rectilinear movements of the power manipulator will correspond to curvilinear arcs in the case of the master arm.

Experience shows that this type of distortion does not represent any difficulty as far as the operator is concerned on condition that excessive angular distortions are not attained.

In the case of braking of the movements of the arm in order to give impressions which are similar to those produced by the mass of the tool, a braking system of the viscous-friction type has been found to produce acceptable results in cases of practical experimentation although, theoretically, the effect is not identical since the laws of variation with velocity and acceleration are not identical.

In order to carry out arm interlocks prior to operation of the motion-control systems, steps are taken to ensure that in the case of each movement, the signals emitted by the position detectors of the different portions of the arm and the position detectors of the different portions of the manipulator are compared with each other as in any motion-control device. However, instead of actuating the manipulator motors, the difference signal actuates the interlock system corresponding to the movement concerned when said difference signal passes through the zero value. A signal accordingly warns the operator if necessary that he may change over to another movement. For the achievement of complete resetting, the full travel corresponding to each of the movements therefore has to be carried out once at a maximum by the operator.

Within the general scope of this invention, there has been developed an adding and multiplying device of particularly simple design for modifying the relation which exists between the movements of the arm and those of the manipulator. This device comprises two identical potentiometers mounted in parallel and each having a slider connected to one end of a third potentiometer which constitutes the detector for one of the arm movements. These two sliders can be displaced either together in the same direction or independently. When they are displaced together in the same direction, the voltage within the detector is varied: this corresponds to a change of origin in the case of the corresponding movement of the manipulator. When the sliders are displaced independently of each other, the voltage drop within the detector is varied: this corresponds to a change of scale in the case of the corresponding movement of the manipulator. If one of the sliders remains stationary while the other slider is displaced, the extremity of the detector which is connected to the first slider constitutes a fixed origin for the change of scale.

One example of construction in accordance with the invention will now be described in detail with reference to the accompanying drawings which illustrate one non-limitative example and which:

Figure 1:
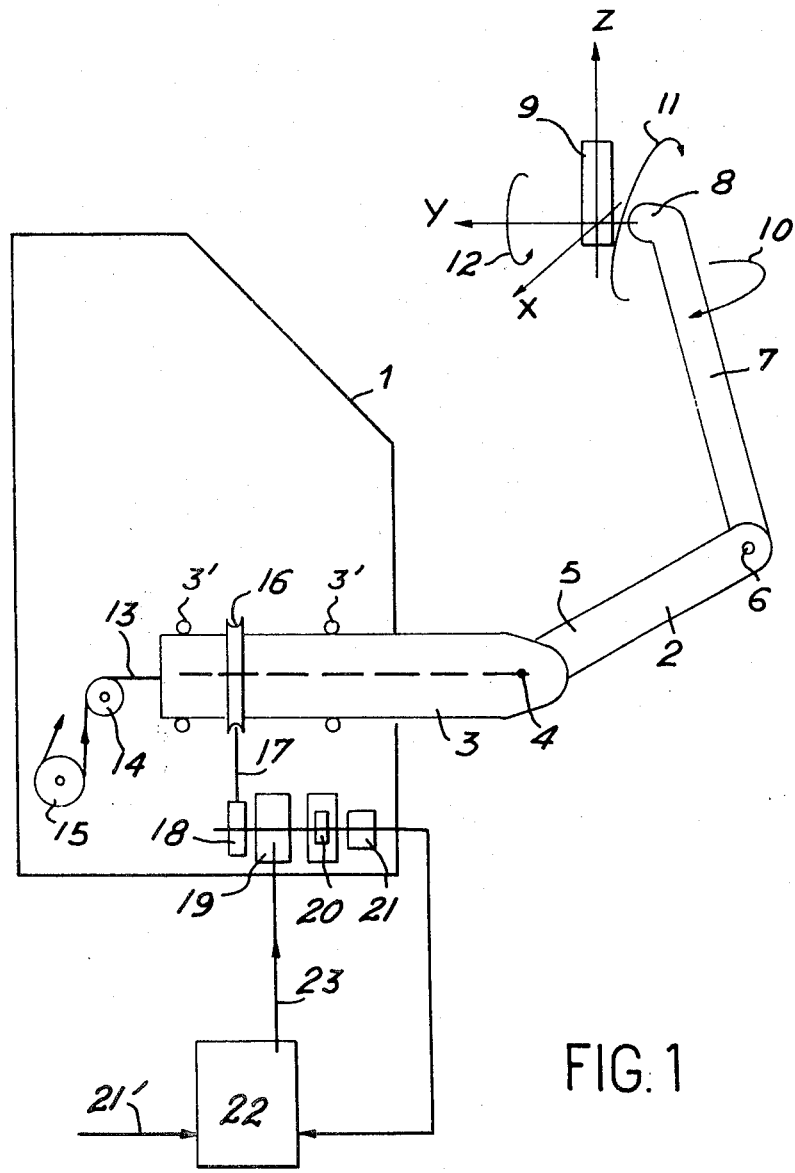
FIG. 1 is a general diagrammatic side view of the control device for a manipulator.
Figure 2:
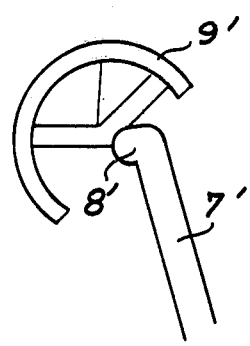
FIG. 2 illustrates an alternative form of the device of FIG. 1.

There is shown in FIGS. 1 and 2 a manipulator control assembly comprising a control panel 1 and a control arm 2. The arm comprises a cylindrical body 3 having a support 3' which provides freedom of one pivotal movement about its own axis. At the right-hand extremity of the cylindrical body is mounted a pivot-pin 4 having an axis at right angles to the body 3 and designated as the shoulder pin which carries an arm 5 pivotally mounted at right angles to said pin. At the extremity of said arm 5, another pivot-pin 6 located at right angles to the arm and parallel to the pivot-pin 4 carries an articulated fore-arm 7 whilst the three segments 3, 5 and 7 form a common plane. There is mounted at the extremity of the fore-arm 7 a wrist element 8 which carries a handle 9. There can be defined at the level of said handle the movements along the axes X, Y. Z to which the following movements will in fact correspond in curvilinear manner: the rotation of the cylindrical body 3 about its axis or general rotation which corresponds to the movements X, the shoulder movement which corresponds to the movements Z and the elbow movement which corresponds to the movements Y. The fore-arm and the wrist are capable of carrying out three movements of rotation, one of which is a movement in azimuth as a result of a rotation of the fore-arm about the pivot-pin in the direction of the arrow 10, a second movement of elevation of the handle in the direction of the arrow 11 and finally a third movement of rotation in the direction of the arrow 12 having an axis at right angles to the handle 9. Said handle 9 could very easily be replaced by a truncated hand-wheel 9' which is shown in detail at the extremity of a fore-arm 7' and pivotally mounted on a knuckle-joint 8'. Said hand-wheel makes it easier to perform operations with both hands.

It is readily apparent that the different portions of the arm 2 are provided with suitable balancing means (not shown in the drawings).

Figure 3:
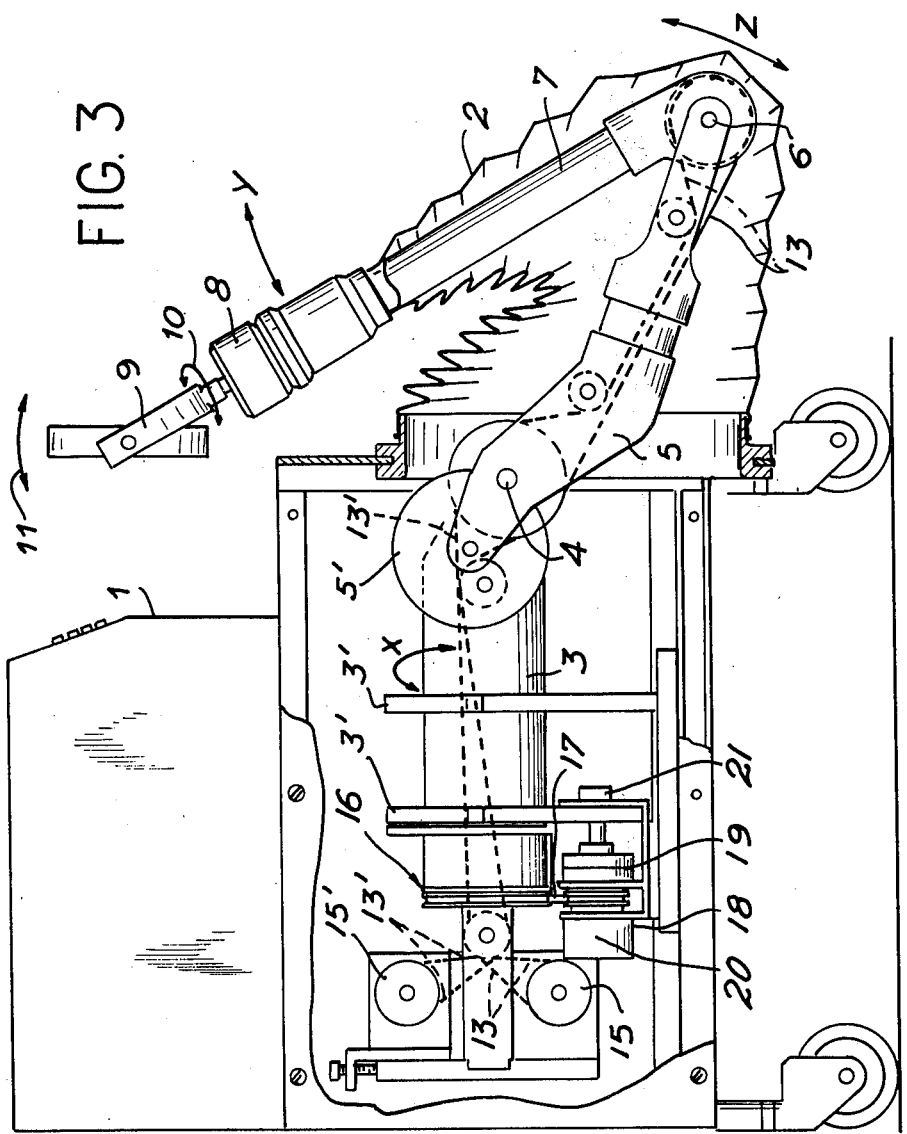
FIG. 3 is a side view of an embodiment comprising a control arm in accordance with the invention.
Figure 4:
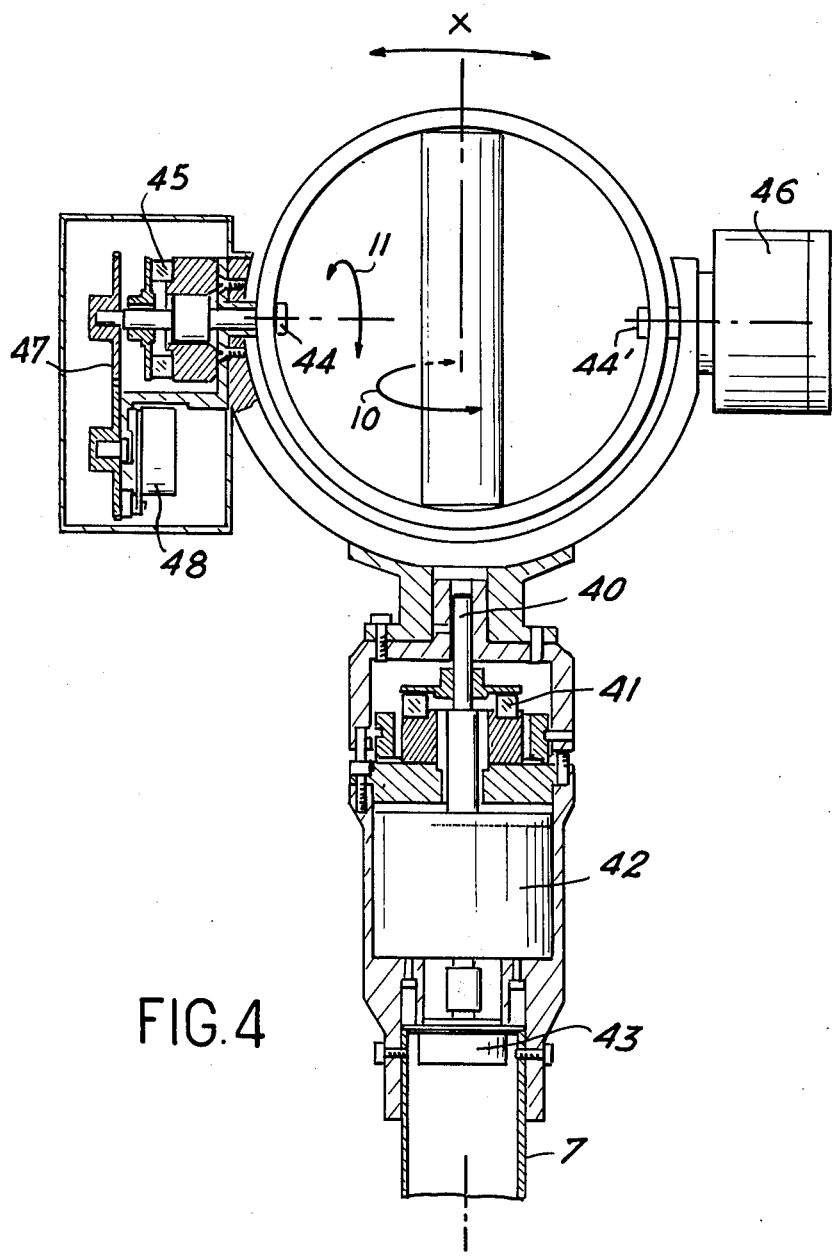
FIG. 4 is a part-sectional front view of the same embodimemt.

FIGS. 3 and 4 relate to a practical form of construction in accordance with the general arrangement which has just been described, the only difference being that one of the movements of the handle, namely the movement corresponding to the arrow 12 in FIG. 1, has been dispensed with. Identical components are designated by the same references in FIGS. 3 and 4 as in FIG. 1.

The different elementary movements of the arm 5 and of the fore-arm 7 which are transmitted by cables and belts to the pivot-pin of the cylindrical body 3 in which the pairs of oppositely-acting cables 13, 13' guided by a pair of pulleys 14 are intended to drive a capstan 18.

The capstan 18 is coupled with a solid-friction brake unit 19, with a second viscous-friction brake unit 20 and with a position transducer 21. Similarly, each of the capstans such as the capstan 15 is also coupled with a solid-friction brake unit, with a second viscous-friction brake unit and with a position transducer (which have been omitted from the drawings).

The movement of rotation of the handle about the axis of the fore-arm is transmitted by a shaft 40 to a solid-friction brake unit 41, a viscous-friction brake unit 42 and a position transducer 43 which are housed in the body of the fore-arm 7 (as shown in FIG. 4). The handle 9 also carries out a pivotal movement about two pivots 44, 44' which are aligned along an axis which is perpendicular to that of the fore-arm 7; this movement is transmitted to a solid-friction brake unit 45, a viscous-friction brake unit 46 and by means of a counter-motion system 47 to a position transducer 48; these devices are placed on each side of the handle.

By reason of the fact that the arrangement is the same in the case of each of the elementary movements, only the equipment relating to one of these elementary movements will be described hereinafter.

Any movement applied to the handle 9 of the hand-wheel 9' applies to all the position transducers such as 21 variable position data which constitute the position-control references for corresponding movements of manipulators. It will be noted that, if a manipulator is designed in accordance with a cartesian and telescopic system, the spatial reproduction resulting from this system will be deformed since the rectilinear movements of the power manipulator will correspond to curvilinear arcs in the case of the master arm.

Experience has shown that, so far as the operator is concerned, this type of distortion does not give rise to any difficulty provided that excessive values of angular distortion are not attained. It is therefore apparent that the transducers such as 21 which can usually consist of potentiometers therefore constitute the motion-control order emitters. However, the control system which is thus limited would cause the operator to commit serious errors of operation. The first error would be the excessively rapid actuation of the control arm which would be liable to exceed the potential capabilities of the power-arm; for this reason, the brake unit 20 provides viscous friction and performs a slowingdown function which is a particular feature of the invention, thus giving the operator an approximate sensation of inertia as he produces action on the handle 9.

Moreover, since the control arm 2 is not power-driven, it is important to be able to resume operation of the power manipulator after an inoperative period without imparting any return motion thereto. This function is performed by the solid-friction brake unit 19. The operation of this unit is initiated when the operator decides to re-couple the control arm in position with the manipulator; the output signal of the potentiometer 21 is compared with the signal delivered by the corresponding potentiometer 21' on the manipulator, both potentiometers being intended to terminate at the electronic control assembly 22. The operator therefore moves the control arm and when the voltages obtained from the potentiometers 21 and 21' are equal, a signal is formed by the connection 23 to said electrical brake unit 19 which stops the movement. By means of successive elementary movements, the operator can therefore couple the control arm in position with the effective position of the manipulator at the time of start-up, thus avoiding any danger of random displacement of this latter. At the time of initial operation of the motion-control system, the same order will release all the brake units, thus cancelling brake application at the moment when the motion-control systems come into action.

It should be mentioned in addition that the handle is provided with control push-buttons and triggers corresponding to the other parameters of the operation to be performed.

Figure 5:
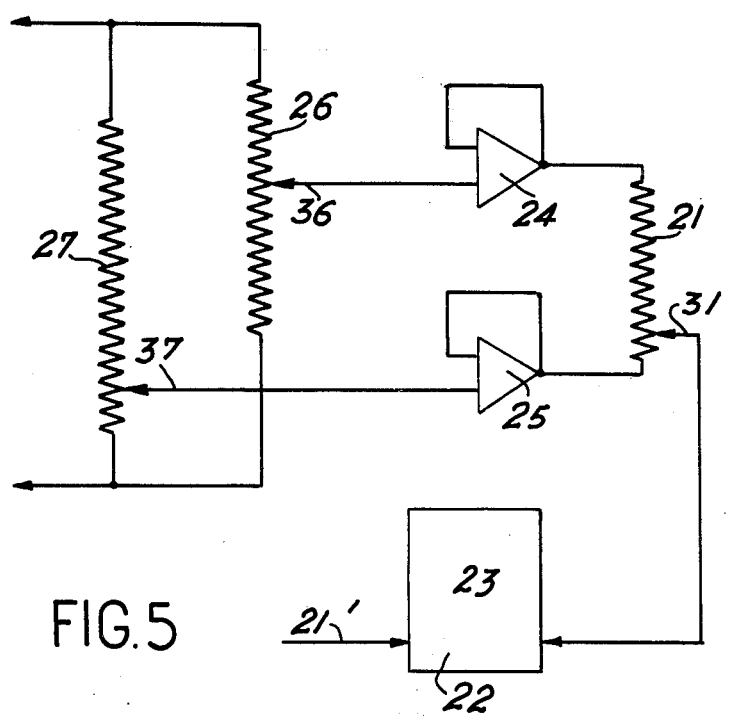
FIG. 5 is a diagram of the adding and multiplying device for one direction.

There is shown in FIG. 5 and in accordance with the invention one form of the adding and multiplying device which makes it possible by means of said control arm to produce movements of the manipulator arm of much greater amplitude than those which are applied to the movements of the control arm. This figure shows the device employed for a single movement which is independent of the control arm and the corresponding movement of the manipulator. The detector is constituted by the potentiometer 21 in which the slider 31 is displaced in accordance with the movements of the control arm. The two extremities of the resistor of said potentiometer are supplied by gain follower amplifiers 24 and 25; this form of construction makes it possible to match the impedance in the conventional manner.

Voltage is supplied to the two extremities of the potentiometer 21 from the sliders 36 and 37 of two identical potentiometers 26 and 27 which are in turn supplied under the same conditions from a directcurrent voltage source (not shown). Since the two potentiometers 26 and 27 are identical, and if the two sliders 36 and 37 are subjected to identical displacements, the voltage difference between these latter or in other words the voltage at the terminals of the potentiometer 21 is maintained constant. On the other hand, in the case of the same arm movement, the voltage delivered by the slider of the potentiometer varies in the same manner and by the same value, thus resulting in a linear displacement of the reference voltage applied throughout the motion-control system 22 for the purpose of comparison with the value 21' derived from the manipulator. This single control device therefore produces action in the same manner as an adding device. Moreover, calibration of the end stops of the single control of the two potentiometers 26 and 27 constitutes an adjustment of the value 0 and also of the maximum value which is intended for the extreme positions of the manipulator which call for said adjustment for the good operation of the potentiometer 21.

The slider of only one of the two potentiometers 26 or 27 can also be displaced, with the result that one of the supply voltages of the potentiometer 21 can remain unchanged while varying the other. Under these conditions, the voltage corresponding to the full travel of the potentiometer 21 has changed and this results in a multiplication of the effect of the same angular displacement by a constant factor which is continuously variable by means of the displacement of said sliders 36 or 37. It is readily apparent that, since the end positions of the sliders 36 and 37 are placed in opposite relation, they correspond to the full travel of the manipulator, namely to the total amplitude of voltage of the datum 21'.

Conversely, the simultaneous displacement of the two sliders 36 and 37 which remain at a constant relative distance will result in the same amplitude at the minimum scale desired, thus displacing in the total travel which is necessary for the manipulator the reference voltage obtained from the control arm. This is tantamount to changing the origin of the position control which connects the control arm to the manipulator whereas the other mode of operation constitutes a scale change.

In a very simple practical embodiment, the potentiometers 26 and 27 are linear potentiometers placed side by side and the sliders 36 and 37 can be coupled together by means of a removable bar; the number of pairs of sliders 26 and 27 corresponds to the number of movements to be varied in amplification and/or origin.

One particularly advantageous application of the arm in accordance with the present invention lies in the control of a programmed manipulator in which the program is obtained by recording signals emitted by a manually directed control element.

We claim:

1. A control arm for a remotely operated power manipulator, comprising an assembly for carrying out a number of movements and position detectors for each movement, wherein the number of possible movements of the control arm is equal to the number of possible movements of the manipulator, wherein the motion-control operations can be interrupted at will and wherein at least one of the portions of the arm is provided with means for interlocking said portion with respect to another portion of the arm independently of the other movements as each position of the manipulator and of the arm are brought into complete concordance, said means for interlocking being releasable when complete concordance is obtained.

2. A control arm according to claim 1, wherein at least one pivotal movement of the arm corresponds to a movement of translation of the manipulator.

3. A control arm according to claim 1, wherein all or nearly all the movements of the arm are movements of rotation.

4. A control arm according to claim 1, wherein at least one movement of the arm is braked in order to give the operator impressions which are similar to those produced by the mass of the tool and of the components employed.

5. A control arm according to claim 4, wherein said arm includes at least one viscous-friction brake unit.

6. A control arm according to claim 1, wherein said arm includes at least one solid-friction brake unit and means for connecting said brake unit to a device for comparing the signals emitted by the position detectors which are responsive to the corresponding movements of the arm and of the manipulator, the connection being such that said brake unit is locked in position when the signals emitted by said position detectors are equal.

7. A control arm according to claim 6, wherein said arm includes a plurality of solid brake units and means for releasing said units when complete concordance between the arm and the manipulator has been obtained.

8. A control arm according to claim 1, wherein said arm includes an adding and multiplying device made up of two identical potentiometers mounted in parallel and the slider of each potentiometer is connected to one of the extremities of a third potentiometer which constitutes a detector, said two sliders being capable of displacement either together in the same direction or independently.

9. A control arm according to claim 1, wherein said arm is so arranged as to control a programmed manipulator in which the program is obtained by recording signals emitted by the manually directed control arm.

* * * * *